(12) United States Patent
Ritter

(10) Patent No.: US 8,745,903 B1
(45) Date of Patent: Jun. 10, 2014

(54) ROCK REMOVAL SKID STEER ATTACHMENT

(76) Inventor: Brandon L. Ritter, Mound City, SD (US)

( * ) Notice: Subject to any disclaimer, the term of this patent is extended or adjusted under 35 U.S.C. 154(b) by 456 days.

(21) Appl. No.: 13/030,112

(22) Filed: Feb. 17, 2011

(51) Int. Cl.
*A01B 13/00* (2006.01)

(52) U.S. Cl.
USPC .................................................. 37/303

(58) Field of Classification Search
USPC ..................... 37/302, 303, 403, 452
See application file for complete search history.

(56) References Cited

U.S. PATENT DOCUMENTS

| | | | | |
|---|---|---|---|---|
| 293,261 | A * | 2/1884 | Matcham | 428/581 |
| 3,044,192 | A * | 7/1962 | Moore | 37/301 |
| 3,103,076 | A * | 9/1963 | Schultz | 37/303 |
| 3,152,706 | A * | 10/1964 | Conrad | 414/732 |
| 3,349,933 | A * | 10/1967 | Simpson et al. | 414/724 |
| 3,706,388 | A * | 12/1972 | Westendorf | 414/724 |
| 3,834,567 | A * | 9/1974 | Miller | 414/724 |
| 3,975,844 | A | 8/1976 | Olson | |
| 4,085,530 | A * | 4/1978 | Landry | 37/446 |
| 4,125,952 | A * | 11/1978 | Jennings | 37/405 |
| 4,467,876 | A | 8/1984 | Gaule | |
| 4,641,439 | A | 2/1987 | Shirek | |
| 4,749,048 | A | 6/1988 | Kelly | |
| 4,903,418 | A * | 2/1990 | Loudon | 37/301 |
| 5,333,693 | A | 8/1994 | Severeid | |
| 5,833,008 | A * | 11/1998 | Reed et al. | 171/141 |
| 5,901,477 | A | 5/1999 | Weaver | |
| 5,901,479 | A * | 5/1999 | Langdon | 37/444 |
| 6,067,733 | A * | 5/2000 | Gasper | 37/367 |
| 6,085,447 | A * | 7/2000 | Rose | 37/403 |
| 6,098,320 | A | 8/2000 | Wass | |
| 6,146,081 | A | 11/2000 | Anderson | |
| 6,308,440 | B1 * | 10/2001 | Mueller | 37/404 |
| 6,401,831 | B2 | 6/2002 | Bouchard | |
| 6,428,108 | B1 * | 8/2002 | Chase | 299/36.1 |
| 6,764,139 | B1 * | 7/2004 | Wortman | 299/10 |
| 7,104,745 | B2 * | 9/2006 | Ochoa | 414/722 |
| 7,520,306 | B1 * | 4/2009 | Berge | 144/334 |
| 7,610,698 | B2 * | 11/2009 | May | 37/302 |
| 8,001,708 | B1 * | 8/2011 | Reed | 37/302 |
| 2004/0060208 | A1 | 4/2004 | Wagner | |
| 2005/0252048 | A1 * | 11/2005 | Segerljung | 37/403 |
| 2007/0059148 | A1 * | 3/2007 | Westendorf et al. | 414/729 |
| 2007/0261276 | A1 * | 11/2007 | Cazes | 37/403 |
| 2010/0212193 | A1 | 8/2010 | Kostyak | |

* cited by examiner

*Primary Examiner* — Thomas B Will
*Assistant Examiner* — Joan D Misa

(57) ABSTRACT

A rock removal skid steer attachment includes a connection portion that has a rear face, a lower edge, and an upper edge. The connection portion is configured for engaging a skid steer. A pair of side plates extends from the connection portion. The side plates are spaced from each other. The distal section of the side plates relative to the connection portion includes a barbed portion. Each of the side plates has a top edge and a lower edge. The top edges taper toward an associated one of the lower edges as the side plates extend away from the connection portion and towards the barbed portions. The side plates are configured to be extended into a ground surface to extract boulders from the ground surface with the barbs.

1 Claim, 4 Drawing Sheets

ROCK REMOVAL SKID STEER ATTACHMENT

BACKGROUND OF THE DISCLOSURE

1. Field of the Disclosure

The disclosure relates to rock removal devices and more particularly pertains to a new rock removal device for attachment to a skid steer to facilitate removal of large rocks from soil and replacement of soil into the void left by removed rocks.

2. Summary of the Disclosure

An embodiment of the disclosure meets the needs presented above by generally comprising a connection portion that has a rear face, a lower edge, and an upper edge. The connection portion is configured for engaging a skid steer. A pair of side plates extends from the connection portion. The side plates are spaced from each other. The distal section of the side plates relative to the connection portion includes a barbed portion. Each of the side plates has a top edge and a lower edge. The top edges taper toward an associated one of the lower edges as the side plates extend away from the connection portion and towards the barbed portions. The side plates are configured to be extended into a ground surface to extract boulders from the ground surface with the barbs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
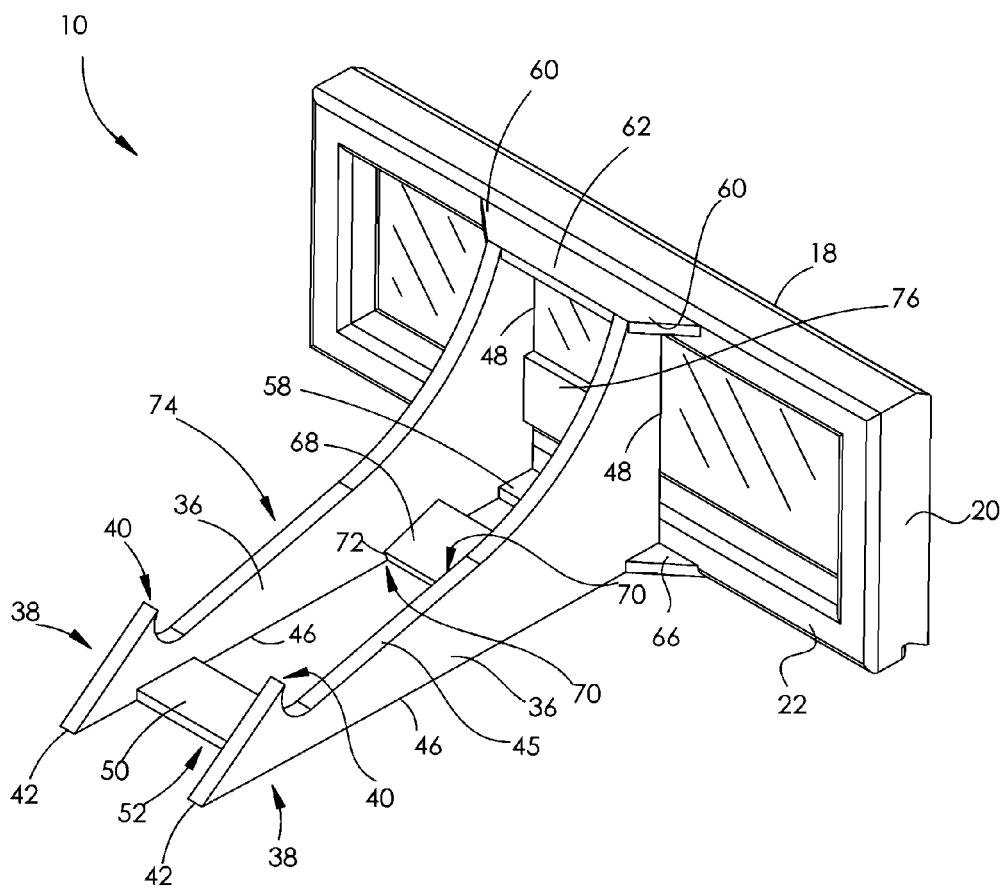
FIG. 1 is a top front side perspective view of a rock removal skid steer attachment according to an embodiment of the disclosure.
Figure 2:
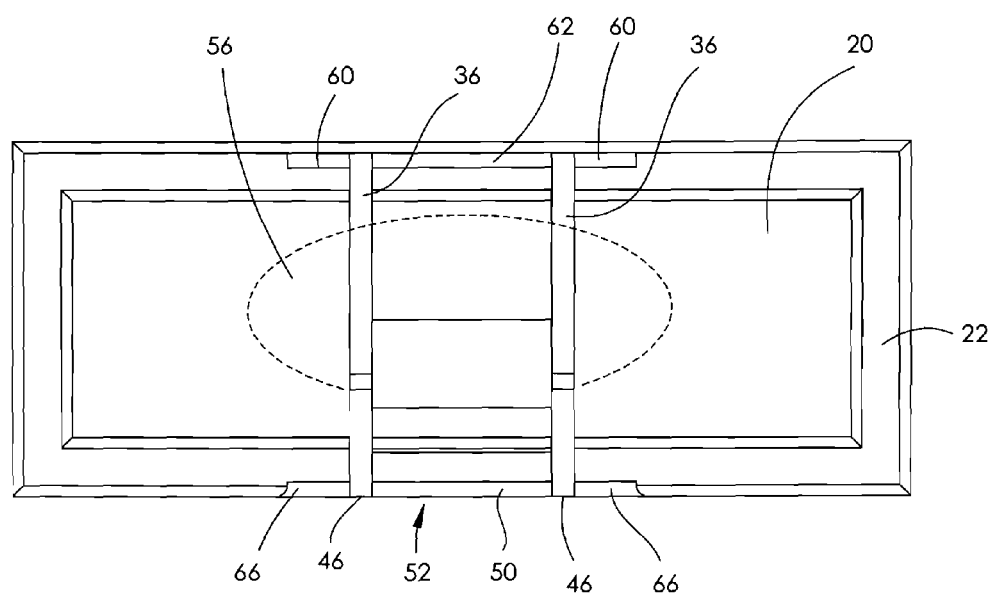
FIG. 2 is a front view of an embodiment of the disclosure.
Figure 3:
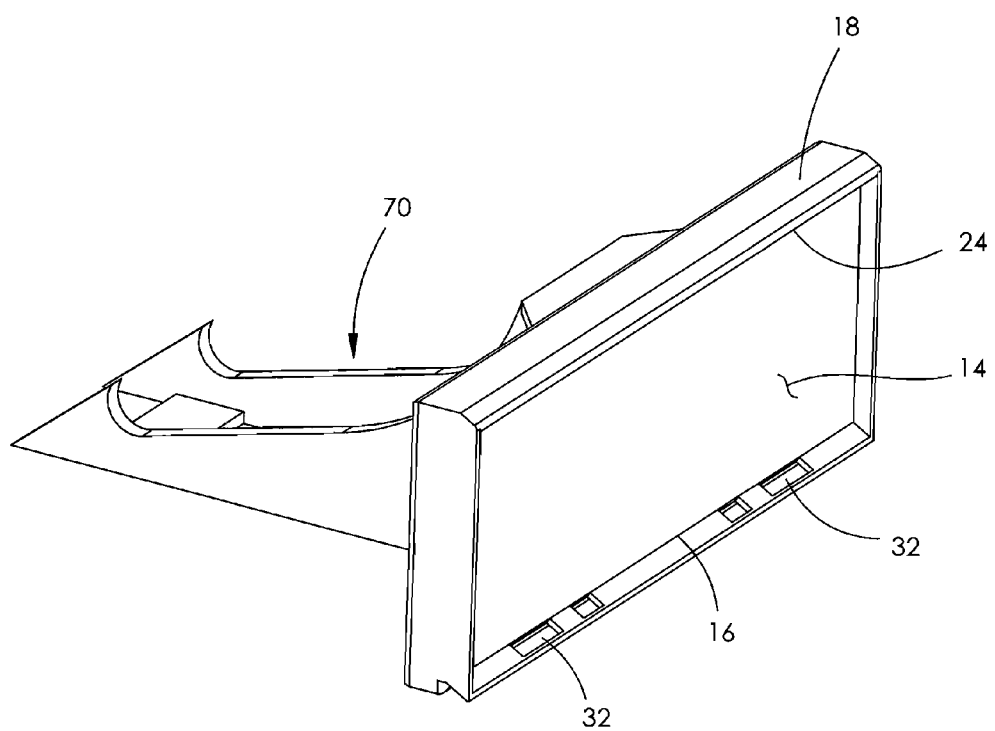
FIG. 3 is a rear perspective view of an embodiment of the disclosure.
Figure 4:
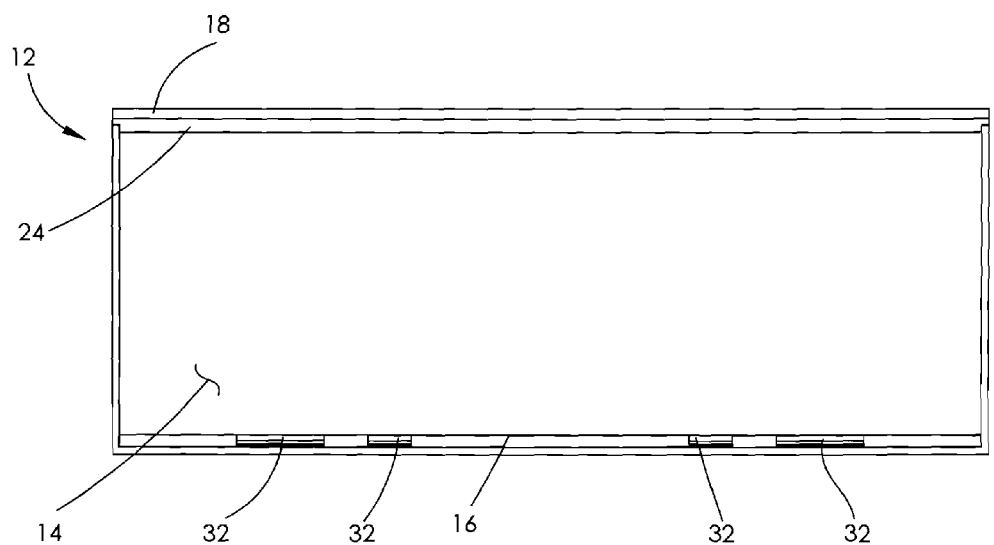
FIG. 4 is a rear view of an embodiment of the disclosure.

With reference now to the drawings, and in particular to FIGS. 1 through 4 thereof, a new rock removal device embodying the principles and concepts of an embodiment of the disclosure and generally designated by the reference numeral 10 will be described.

As best illustrated in FIGS. 1 through 4, the rock removal skid steer attachment 10 generally comprises a connection portion 12 having a rear face 14. The connection portion 12 includes a lower edge 16 and an upper edge 18. The connection portion 12 also includes a planar section 20 and a perimeter wall 22 extending from the planar section 20. A lip 24 is positioned at the upper edge 18 of the connection portion 12. The lip 24 is configured for engaging a skid steer.

A plurality of openings 32 is positioned in the connection portion 12. Each opening 32 is positioned proximate the lower edge 16 of the connection portion 12. Thus, the connection portion 12 is configured for securing to a conventional skid steer. It should be well understood to those in the art that rear face 14, lip 24 and openings 32 form a universal skid steer attachment which is typically used for various skid steer attachments as a skid steer includes jaws and teeth specifically formed for engaging these sections of the connection portion 12 and no claim is made to these elements.

A pair of opposed side plates 36 extends from the connection portion 12. The side plates 36 are spaced from each other. Each of the side plates 36 tapers extending away from the connection portion 12 towards a distal section 38 of each side plate 36 relative to the connection portion 12. The distal section 38 of each of the side plates 36 includes a barbed portion 40. In particular, each of said side plates includes a top edge 45 and a lower edge 46. The lower edge 46 is approximately straight and may form an angle with the extension portion between 85° and 95°. The top edge 45 begins adjacent to the upper 18 and tapers downwardly toward the lower edge 46 from the connection portion 12 to the barbed portion 40 at which point the top edge 45 extends upwardly away from the lower edge 46 to form the barbed portion 40. The top edge 45 may be arcuate from the connection member 12 to the barbed portion 40. The side plates extend between 0.75 m and 2.0 m away from the connection portion. It should be understood that the side plates 36 are fixed and non-movable with respect to the connection portion 12 and form the only rock engaging members of the attachment 10. In particular, no upper, movable jaw is being utilized with the side plates 36.

Each of the side plates 36 is coupled to the perimeter wall 22. The distal section 38 of each side plate 36 relative to the connection portion 12 includes a terminal end 42 which is pointed and configured for facilitating insertion of the side plates 36 into a ground surface. Further, the side plates 36 may be planar and orientated parallel to each other. The side plates 36 each include a proximal edge 48 relative to the connection portion 12. The proximal edge 48 extends between the upper edge 18 of the connection portion 12 and the lower edge 16 of the connection portion 12. Each of the side plates 36 may also extend from the connection portion 12 at a right angle.

A first gusset plate 50 is coupled to and extends between the side plates 36. The first gusset plate 50 is positioned proximate the distal section 38 of each side plate 36 relative to the connection portion 12. A bottom face 52 of the first gusset plate 50 may be coplanar with the lower edge 46 of each of the side plates 36. By pivoting of the connection portion 12 by the skid steer, the first gusset plate 50 may be used to refilling voids left by the removal of large rocks 56. A second gusset plate 58 is coupled to and extends between the side plates 36. The second gusset plate 58 is positioned proximate the connection portion 12. The second gusset plate 58 may be coplanar with the first gusset plate 50. Further, triangular upper gussets 60 may be coupled to and extend between the perimeter wall 22 of the connection portion 12 and the side plates 36. Upper gussets 60 may be coplanar with a top gusset plate 62 extending between a top 64 of each side plate 36. Triangular lower gussets 66 may be coupled to and extend between the perimeter wall 22 of the connection portion 12 and the side plates 36. The lower gussets 66 may be positioned coplanar with the second gusset plate 58.

A third gusset plate 68 may be coupled to and extend between the side plates 36. The third gusset plate 68 is positioned between the first gusset plate 50 and the second gusset plate 58 proximate a middle 70 of each side plate 36. The third gusset plate 68 may be angled to extend upwardly from a forward edge 72 of the third gusset plate 68 towards the connection portion 12. This angling provides additional structural support and integrity to the side plates 36 during use. An additional fourth gusset plate 76 may be positioned transversely relative to the first gusset plate 50 and the second gusset plate 58 proximate the connection portion 12.

In use, the connection portion 12 is attached to the skid steer. By pivoting of the connection portion 12 and locomotion of the skid steer, the side plates 36 may be manipulated to pry loose and lift large rocks in the ground. The barbed portion 40 prevents the large rocks from sliding off of the distal section 38 of the side plates 36 once the rock is positioned on a cradling portion 74 of the side plates 36. Further, the barbed portion 40 may be used to snag edges of large embedded rocks to facilitate prying and removal. After the rock has been removed, further manipulation of the connection portion 12 and the skid steer permit use of the first gusset plate 50 to refill voids left by the removal of the rock in similar fashion to using a hoe.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A rock removal skid steer attachment comprising:
    a connection portion having a rear face, a lower edge, and an upper edge, said connection portion having a planar section and a perimeter wall extending from said planar section, said connection portion including a lip being positioned at said upper edge of said connection portion, said lip being configured for engaging an upper edge of a panel coupled to a skid steer, said connection portion having a plurality of openings therein, said openings being positioned proximate said lower edge of said connection portion whereby said connection portion is configured for being secured to the skid steer by teeth attached to said skit steer extending through said openings;
    a pair of side plates extending from said connection portion, said side plates being spaced from each other, each of said side plates including a distal section relative to said connection portion, said distal section of each of said side plates having a barbed portion, each of said side plates having a top edge and a lower edge, each of said top edges tapering toward an associated one of said lower edges as said side plates extend away from said connection portion towards said barbed portion, wherein said side plates are configured to be extended into a ground surface to extract boulders from the ground surface with said barbed portions, wherein said side plates are configured to support a boulder such that the boulder is positioned between said side plates and such that a portion of the bolder extends below said top edges;
    each of said side plates is coupled to said perimeter wall, said distal section of each said side plate relative to said connection portion including a pointed terminal end configured for facilitating insertion of said side plates into the ground surface, said lower edge of each said side plate being straight, said side plates being planar and parallel to each other, said side plates each having a proximal edge relative to said connection portion, said proximal edge extending between said upper edge of said connection portion and said lower edge of said connection portion, each of said side plates extends from said connection portion at a right angle;
    a first gusset plate coupled to and extending between said side plates, said first gusset plate being positioned proximate said distal section of each said side plate relative to said connection portion, a bottom face of said first gusset plate is coplanar with a bottom edge of each of said side plates;
    a second gusset plate coupled to and extending between said side plates, said second gusset plate being positioned proximate said connection portion, said second gusset plate is coplanar with said first gusset plate; and
    a third gusset plate coupled to and extending between said side plates, said third gusset plate being positioned between said first gusset plate and said second gusset plate proximate a middle of each said side plate, said third gusset plate is angled to extend upwardly from a forward edge of said third gusset plate towards said connection portion.

* * * * *